UNITED STATES PATENT OFFICE.

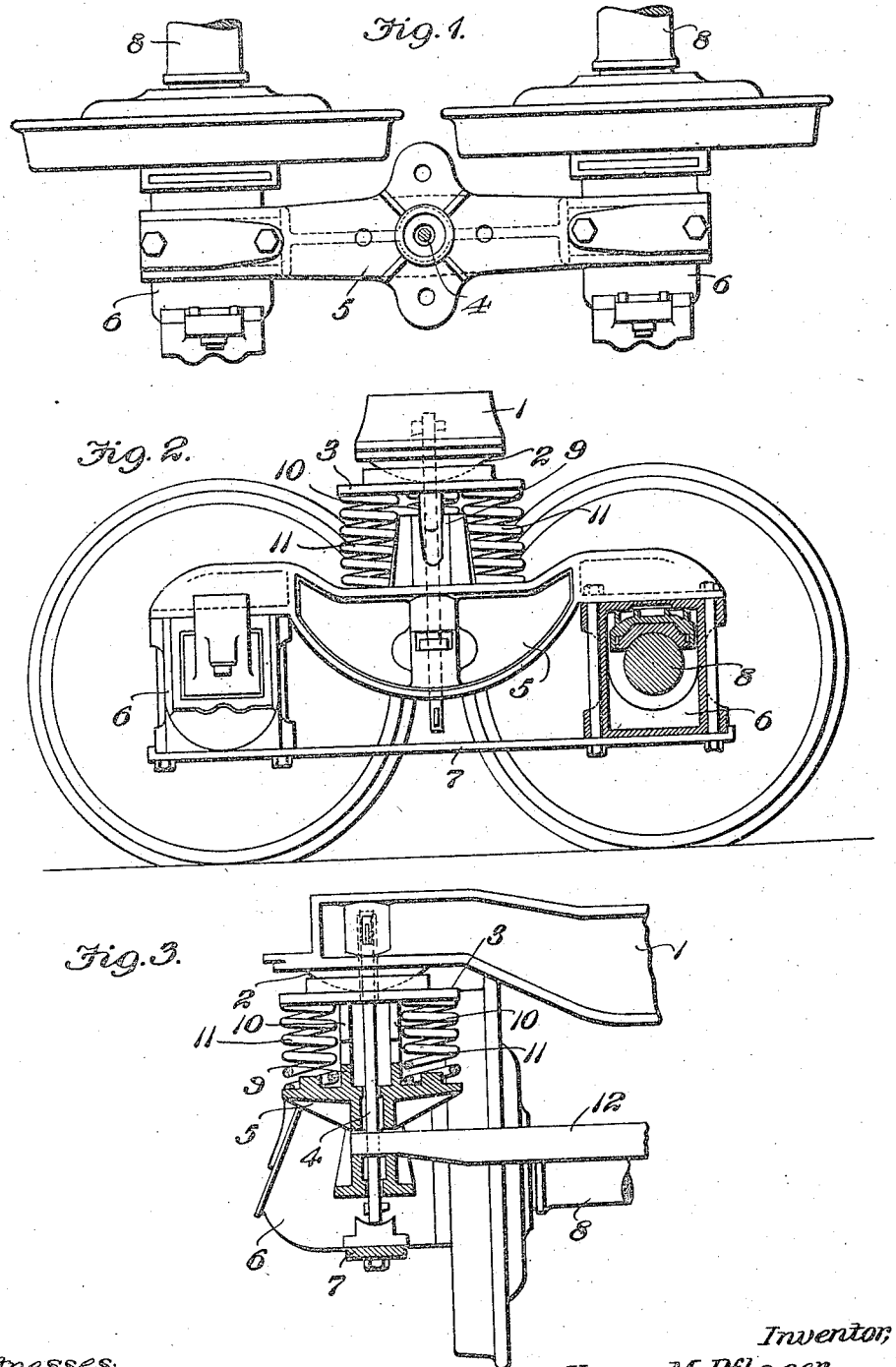

HARRY M. PFLAGER, OF ST. LOUIS, MISSOURI.

CAR CONSTRUCTION.

1,147,429.	Specification of Letters Patent.	Patented July 20, 1915.

Application filed February 21, 1914. Serial No. 820,183.

*To all whom it may concern:*

Be it known that I, HARRY M. PFLAGER, a citizen of the United States, residing at the city of St. Louis, State of Missouri, have invented a certain new and useful Improvement in Car Construction, of which the following is a full, clear, and exact description, such as will enable others skilled in the art to which it appertains to make and use the same, reference being had to the accompanying drawings, forming part of this specification, in which—

Figure 1 is a partial top plan view of my improvement in car construction. Fig. 2 is a side elevational view of the same. Fig. 3 is a cross sectional view taken between the wheels.

This invention relates to a new and useful improvement in car construction of that type disclosed in United States Letters Patent No. 995,560 granted to me June 20, 1911.

My present improvement relates more particularly to the utilization of a rocking bearing interposed between the side truck frames and the car body whereby the side truck frames have greater flexibility of movement, thus making the car "easy riding."

In the drawings 1 indicates the body bolster of the car which is provided at each end with convex bearings 2 coöperating with concave seats in spring followers 3. It is obvious that the bearing between the spring follower and the ends of the bolster may be of a different form, but I prefer the spherical bearing on account of its ability to slightly rock in service thereby contributing to the flexibility of the construction.

There is no so-called center bearing in my improved car construction, but both side truck frames are swiveled, a king pin 4 being employed for this purpose, the upper end of said pin being secured in part of the body of the car, said pin passing down through a slightly enlarged opening in the follower plate 3 so as to permit a rocking movement between the parts and casting 5 which latter practically constitutes an equalizing bar, said casting carrying the journal boxes 6 at each end, the lower ends of which journal boxes are connected together by a tie bar 7. These journal boxes are preferably bolted to the ends of the equalizing bar and the axles 8, which are journaled therein, coöperate with brasses swiveled in the journal boxes in a manner similar to that disclosed in my aforesaid Patent No. 995,560. The equalizing bar is formed with upwardly extending slotted projections 9 about its center into the slots of which fit extensions 10 depending from the spring follower 3. This construction permits vertical movement but prevents independent rotation of the spring follower and side truck frame.

11 are the supporting springs centered on teats formed on the spring follower 3 and the equalizer 9.

The side truck frames or equalizers at each side of the car are preferably tied together by means of a bar 12 secured therein, as shown in Fig. 3.

The above construction provides a more flexible mounting for the side truck frames each of which are swiveled to turn under the ends of the body bolsters from the wheel axles swiveling in the side truck frames to accommodate this movement when the car is taking a curve.

In the drawings I have shown my improved side truck frame as being pivotally connected to the body bolster portion of the underframe, but it is obvious that this pivotal connection could be made with the car body, or any other part of the underframe and in using the expression "underframe" in the following claims, it will be understood to include any portion of the car body, its sills, or underframe members.

I claim:

1. In car construction, an underframe, truck frames pivotally connected thereto, said truck frames having two or more journal boxes, wheels and axles mounted in the journal boxes and having swiveled relation thereto, and a rocking bearing interposed between the side truck frames and the underframe.

2. In car construction, an underframe, side truck frames each having rocking relation to said underframe, journal boxes carried by said truck frame, and axles mounted in said journal boxes and having horizontal swiveled relation thereto whereby parallelism may be maintained between said axles and said truck frames at all times.

3. In car construction, an underframe carrying rocking bearings, spring followers coöperating with said bearings, springs and king pins passing through said bearings and side truck frames 4. In car construction, an underframe having rocking bearings, a spring follower co-operating with said bearings, springs, side truck frames, and means on the side truck frames and said spring followers for preventing independent rotation thereof but permitting vertical movement of said parts relative to each other.

5. In car construction, an underframe having rocking bearings, spring followers co-operating with said bearings and side truck frames, there being a king bolt passing through said parts at each corner of the car to form a pivotal point for each car truck frame, and wheels and axles mounted in the frames.

6. In car construction, an underframe, truck side frames each having pivotal relation at their centers to said underframe by means of a rocking bearing, journal boxes fixedly carried by the truck side frames, and axles mounted in said journal boxes.

7. In car construction, the combination with an underframe, of truck side frames each separately pivotally connected therewith, said truck side frames having recesses for receiving a cross connecting member, a cross connecting member, and a king bolt passing through a portion of the underframe of the car, the truck side frame and the end of said cross connecting member, said king bolt forming a pivotal axis about which the truck frame swings.

In testimony whereof I hereunto affix my signature in the presence of two witnesses, this 7th day of February, 1914.

HARRY M. PFLAGER.

Witnesses:
M. P. SMITH,
C. S. BUTLER.

Copies of this patent may be obtained for five cents each, by addressing the "Commissioner of Patents, Washington, D. C."